(12) United States Patent
Donie et al.

(10) Patent No.: US 8,065,556 B2
(45) Date of Patent: Nov. 22, 2011

(54) APPARATUS AND METHOD TO MANAGE REDUNDANT NON-VOLATILE STORAGE BACKUP IN A MULTI-CLUSTER DATA STORAGE SYSTEM

(75) Inventors: Benjamin Jay Donie, Tucson, AZ (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 12/371,442

(22) Filed: Feb. 13, 2009

(65) Prior Publication Data

US 2010/0211821 A1    Aug. 19, 2010

(51) Int. Cl.
   *G06F 11/00*    (2006.01)
(52) U.S. Cl. .......................................................... 714/6
(58) Field of Classification Search .................. 714/6, 6.2
   See application file for complete search history.

(56) References Cited

U.S. PATENT DOCUMENTS

| | | | |
|---|---|---|---|
| 6,367,029 B1 | 4/2002 | Mayhead et al. | |
| 6,691,244 B1 | 2/2004 | Kampe et al. | |
| 6,938,184 B2 * | 8/2005 | Totolos, Jr. ..................... | 714/14 |
| 7,143,167 B2 | 11/2006 | Kampe et al. | |
| 2002/0042870 A1 | 4/2002 | Rocray et al. | |
| 2002/0049845 A1 | 4/2002 | Sreenivasan et al. | |
| 2002/0065998 A1 | 5/2002 | Buckland | |
| 2004/0059870 A1 | 3/2004 | Ash et al. | |
| 2005/0021906 A1 * | 1/2005 | Nakamura et al. ............ | 711/113 |
| 2005/0063216 A1 | 3/2005 | Wilkins et al. | |
| 2005/0102548 A1 | 5/2005 | Lindenstruth et al. | |
| 2005/0193240 A1 | 9/2005 | Ash et al. | |
| 2005/0193242 A1 * | 9/2005 | Ash et al. .......................... | 714/8 |
| 2005/0240809 A1 * | 10/2005 | Ash et al. .......................... | 714/8 |
| 2006/0153068 A1 | 7/2006 | Dally et al. | |
| 2007/0180309 A1 * | 8/2007 | Zohar et al. ....................... | 714/6 |
| 2009/0327801 A1 * | 12/2009 | Maeda et al. ..................... | 714/6 |

FOREIGN PATENT DOCUMENTS

EP    1507204    2/2005

OTHER PUBLICATIONS

Nakamura, Hiroshi et al., "Skewed Checkpointing for Tolerating Multi-Node Failures," Proceedings of the 23rd IEEE International Symposium on Reliable Distributed Systems, pp. 216-125, Published: Los Alamitos, CA., USA 2004.
International Search Report and Written Opinion dated May 17, 2010.

* cited by examiner

*Primary Examiner* — Bryce P Bonzo
(74) *Attorney, Agent, or Firm* — Dale F. Regelman; Quarles & Brady LLP

(57) ABSTRACT

An apparatus and method to manage redundant non-volatile storage ("NVS") data backups in a data storage system comprising (n) clusters, wherein each cluster comprises a processor and a cache, and wherein each cache comprises a first NVS portion and a second NVS portion, wherein the method configures, for each value of (i), a primary NVS backup for an (i)th cluster, where that (i)th primary NVS backup comprises a first NVS portion of a cache disposed in an (i+1)th modulo (n) cluster, wherein (i) is greater than or equal to 0 and less than (n). The method further configures, for each value of (i), a secondary NVS backup for an (i)th cluster, where that (i)th secondary NVS backup comprises a second NVS portion of a cache disposed in an (i+2)th modulo (n) cluster.

25 Claims, 13 Drawing Sheets

FIG. 8F

| CACHE 214 DISPOSED IN CLUSTER 0 | ~~CACHE 224 DISPOSED IN CLUSTER 1~~ | ~~CACHE 234 DISPOSED IN CLUSTER 2~~ | CACHE 244 DISPOSED IN CLUSTER 3 |
|---|---|---|---|
| PRIMARY NVS FOR CLUSTER 3 | ~~PRIMARY NVS FOR CLUSTER 0~~ | ~~PRIMARY NVS FOR CLUSTER 1~~ | PRIMARY NVS FOR CLUSTER 2 |
| SECONDARY NVS FOR CLUSTER 2 DESTAGE | ~~SECONDARY NVS FOR CLUSTER 3~~ | ~~SECONDARY NVS FOR CLUSTER 0~~ | SECONDARY NVS FOR CLUSTER 1 DESTAGE |

FIG. 8G

| CACHE 214 DISPOSED IN CLUSTER 0 | CACHE 244 DISPOSED IN CLUSTER 3 |
|---|---|
| PRIMARY NVS FOR CLUSTER 3 | *PRIMARY NVS FOR CLUSTER 0 ONLINE* |
| SECONDARY NVS FOR CLUSTER 2 | SECONDARY NVS FOR CLUSTER 1 |

FIG. 8H

| CACHE 214 DISPOSED IN CLUSTER 0 | CACHE 244 DISPOSED IN CLUSTER 3 |
|---|---|
| PRIMARY NVS FOR CLUSTER 3 | PRIMARY NVS FOR CLUSTER 0 ONLINE |
| SECONDARY NVS FOR CLUSTER 2 DESTAGE | SECONDARY NVS FOR CLUSTER 1 DESTAGE |

FIG. 8I

| CACHE 214 DISPOSED IN CLUSTER 0 | CACHE 244 DISPOSED IN CLUSTER 3 |
|---|---|
| NVS FOR CLUSTER 3 | NVS FOR CLUSTER 0 |
| | |

US 8,065,556 B2

APPARATUS AND METHOD TO MANAGE REDUNDANT NON-VOLATILE STORAGE BACKUP IN A MULTI-CLUSTER DATA STORAGE SYSTEM

FIELD OF THE INVENTION

The present invention relates generally to data storage systems and, more particularly, to managing primary and secondary redundant NVS in multi-cluster systems.

BACKGROUND OF THE INVENTION

Data storage systems are used to store information provided by one or more host computer systems. Such data storage systems receive requests to write information to a plurality of data storage devices and requests to retrieve information from that plurality of data storage devices.

SUMMARY OF THE INVENTION

The Applicants' invention comprises an apparatus and method to manage non-volatile storage ("NVS") data backups. The method supplies a data storage system comprising (n) clusters, wherein (n) is greater than or equal to 3, and wherein each cluster comprises a processor and a cache, and wherein each cache comprises a first NVS portion and a second NVS portion.

The method configures, for each value of (i), a primary NVS backup for an (i)th cluster, where that (i)th primary NVS backup comprises a first NVS portion of a cache disposed in an (i+1)th modulo (n) cluster, wherein (i) is greater than or equal to 0 and less than (n). The method further configures, for each value of (i), a secondary NVS backup for an (i)th cluster, where that (i)th secondary NVS backup comprises a second NVS portion of a cache disposed in an (i+2)th modulo (n) cluster.

The method further detects a new cluster, and reconfigures the NVS backups disposed in a data storage system now comprising (n+1) clusters. The method further detects a failed cluster, and reconfigures the NVS backups disposed in a data storage system now comprising (n−1) clusters. The method further detects multiple cluster failures, and reconfigures NVS backup for the operable clusters remaining in the data storage system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 8B, 8C, 8D, 8E, 8F, 8G, 8H, and 8I illustrate certain steps of the method of FIG. 8A.

DETAILED DESCRIPTION OF THE PREFERRED EMBODIMENTS

Figure 1:
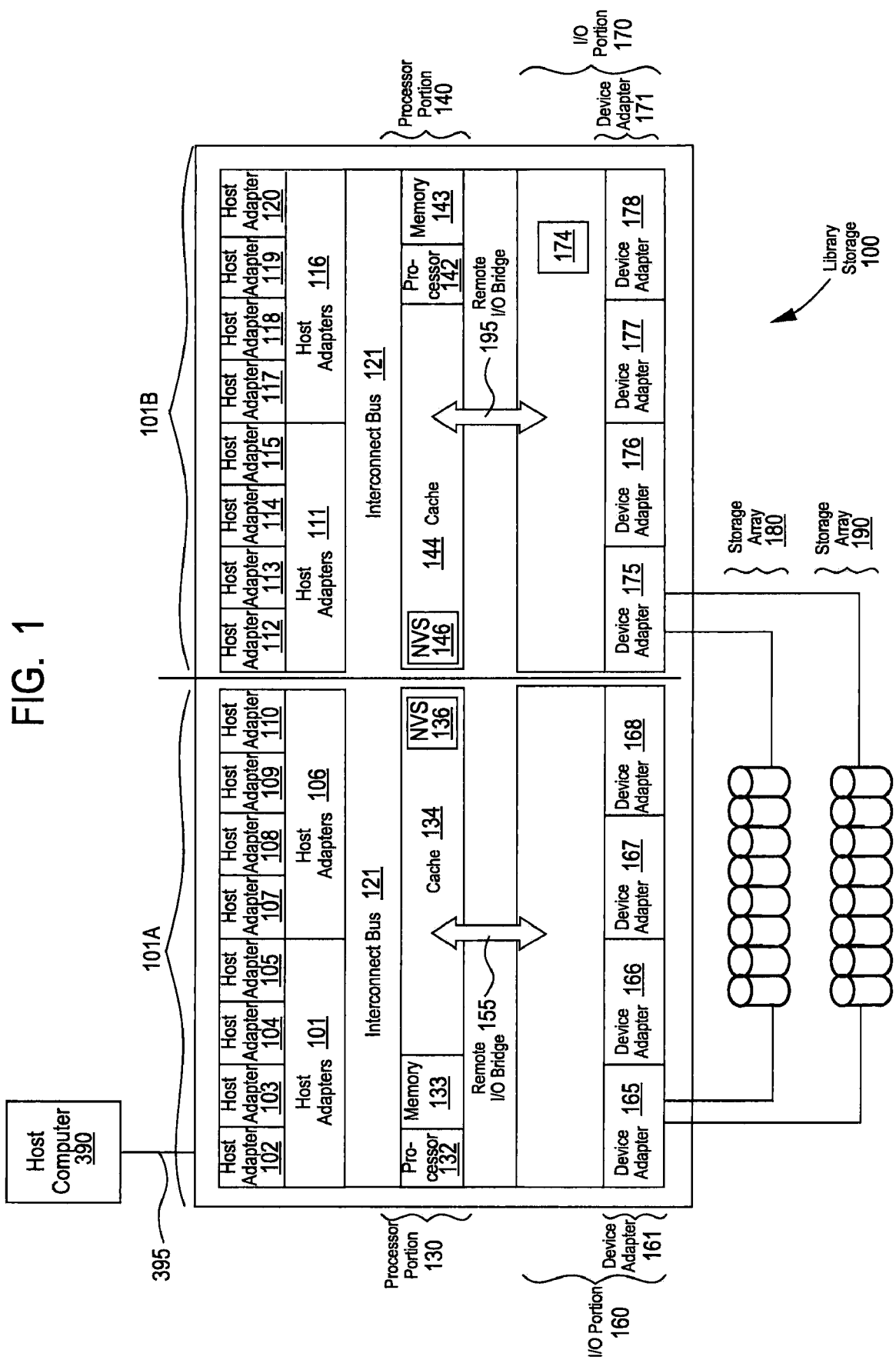
FIG. 1 is a block diagram illustrating one embodiment of Applicants' storage library comprising two clusters.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules (e.g., modules 410-460, FIG. 4) in order to more particularly emphasize their implementation independence. For example, a module (e.g., modules 410-460, FIG. 4) may be implemented as a hardware circuit comprising custom VLSI circuits or gate arrays, off-the-shelf semiconductors such as logic chips, transistors, or other discrete components. A module (e.g., modules 410-460, FIG. 4) may also be implemented in programmable hardware devices such as field programmable gate arrays, programmable array logic, programmable logic devices, or the like.

Modules (e.g., modules 410-460, FIG. 4) may also be implemented in software for execution by various types of processors. An identified module of executable code may, for instance, comprise one or more physical or logical blocks of computer instructions which may, for instance, be organized as an object, procedure, or function. Nevertheless, the executables of an identified module (e.g., modules 410-460, FIG. 4) need not be physically collocated, but may comprise disparate instructions stored in different locations which, when joined logically together, comprise the module and achieve the stated purpose for the module.

Indeed, a module of executable code (e.g., modules 410-460, FIG. 4) may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams included are generally set forth as logical flow-chart diagrams (e.g., FIGS. 5A, 6A, 7A, and 8A). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 5A, 6A, 7A, and 8A). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In the illustrated embodiment of FIG. 1, data storage library 100 comprises a first cluster 101A and a second cluster 101B, wherein clusters 101A and 101B are disposed in the same housing. In the illustrated embodiment of FIG. 1, data storage system 100 comprises a plurality of host adapters 102-105, 107-110, 112-115, and 117-120, disposed in four host bays 101, 106, 111, and 116. In other embodiments, Applicants' data storage system includes fewer than 16 host adapters. Regardless of the number of host adapters disposed in any embodiments of Applicants' system, each of those host adapters comprise a shared resource that have equal access to both central processing/cache elements 130 and 140.

Each host adapter may comprise one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage system 100.

Storage controller portion 130 includes processor 132 and cache 134. In certain embodiments, storage controller portion 130 further includes computer readable medium 133. In certain embodiments, computer readable medium 133 comprises random access memory. In certain embodiments, computer readable medium 133 comprises non-volatile memory.

Storage controller portion 140 includes processor 142 and cache 144. In certain embodiments, storage controller portion 140 further includes computer readable medium 143. In certain embodiments, computer readable medium 143 comprises random access memory. In certain embodiments, computer readable medium comprises non-volatile memory.

When cluster 101A receives data from host computer 390, processor 132 writes that data to cache 134 and to NVS 146 disposed in cluster 101B. If cluster 101A fails before destaging the host computer data from cache 134 to disk, then a backup copy of the host computer data remains available in NVS 146. Similarly, when cluster 101B receives data from host computer 390, processor 142 writes that data to cache 144 and to NVS 136 disposed in cluster 101A. If cluster 101BA fails before destaging the host computer data from cache 144 to disk, then a backup copy of the host computer data remains available in NVS 136.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, storage controller portion 130, and one or more device adapters, are packaged together on a single card disposed in Applicants' data storage system. Similarly, in certain embodiments, one or more host adapters, storage controller portion 140, and one or more device adapters, are disposed on another card disposed in Applicants' data storage system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' data storage system includes more than two storage device arrays. Each storage array appears to a host computer as one or more logical devices.

In certain embodiments, one or more of the data storage devices comprise a plurality of hard disk drive units, such as plurality of disk drive units 180 and/or 190. In the illustrated embodiment of FIG. 1, disk array "A" comprises Storage Array 180. Disk array "B" comprises Storage Array 190. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

Figure 2:
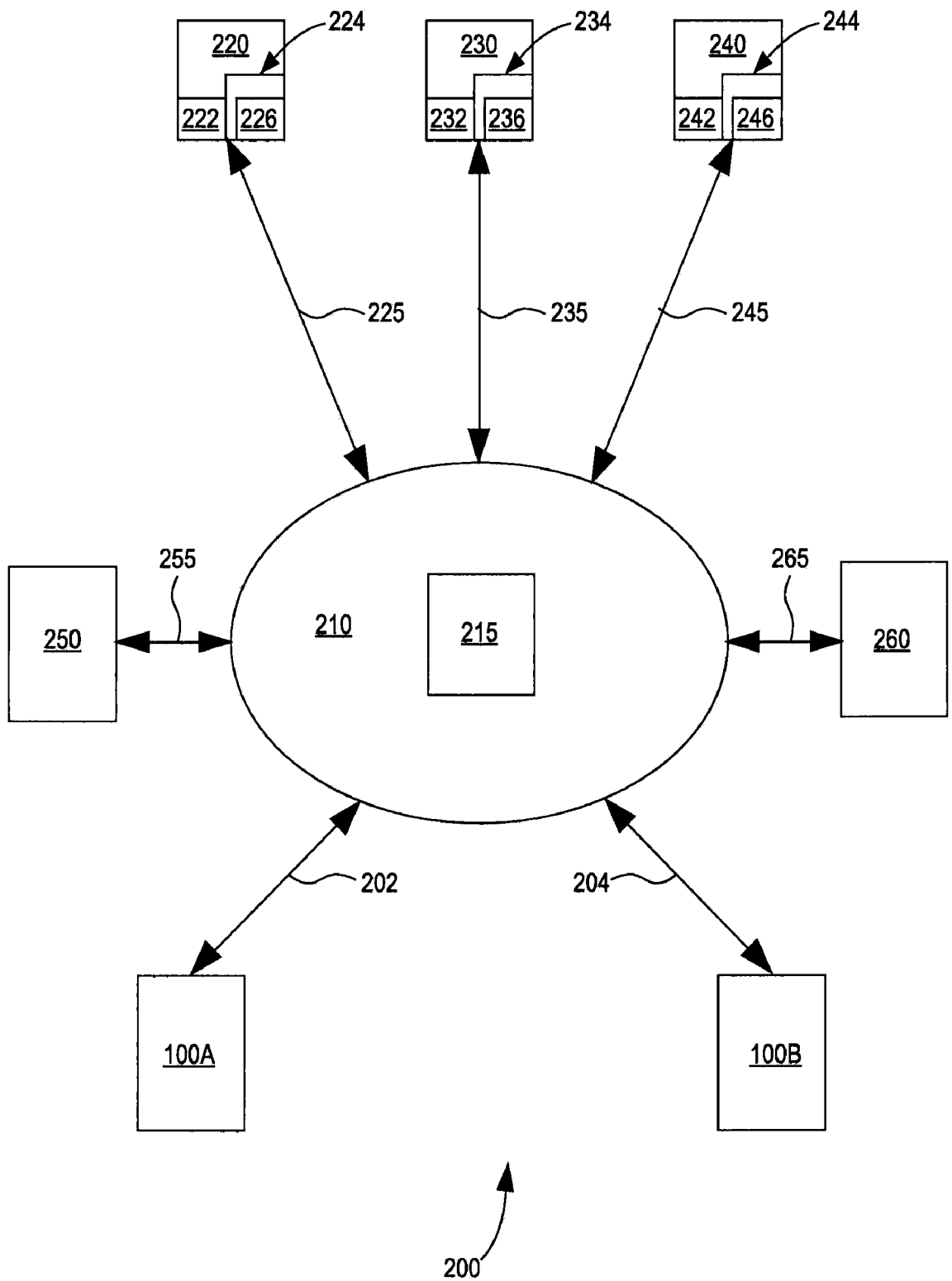
FIG. 2 is a block diagram illustrating a data storage system comprising two data storage libraries of FIG. 1, comprising a total of 4 clusters.

In the illustrated embodiment of FIG. 2, host computers 220, 230, and 240, are connected to fabric 210 utilizing I/O protocols 225, 235, and 245, respectively. I/O protocols 225, 235, and 245, may be any type of I/O protocol; for example, a Fibre Channel ("FC") loop, a direct attachment to fabric 210 or one or more signal lines used by host computers 225, 235, and 245, to transfer information to and from fabric 210.

In certain embodiments, fabric 210 includes, for example, one or more FC switches 215. In certain embodiments, those one or more switches 215 comprise one or more conventional router switches. In the illustrated embodiment of FIG. 2, one or more switches 215 interconnect host computers 225, 235, and 245, to data storage libraries 100A (FIG. 1) and 100B (FIG. 1) via I/O protocols 202 and 204, respectively. I/O protocols 202 and 204 may comprise any type of I/O interface, for example, a Fibre Channel, Infiniband, Gigabit Ethernet, Ethernet, TCP/IP, iSCSI, SCSI I/O interface or one or more signal lines used by FC switch 215 to transfer information through to and from storage libraries 100A and 100B, and subsequently data storage media.

In the illustrated embodiment of FIG. 2, network attached storage device ("NASD") 250 and Applicants' NVS controller 260, are in communication with fabric 210 via I/O protocols 255 and 265, respectively. In certain embodiments, NASD 250 manages the communications between host computers 220, 230, and 240, with data storage libraries 100A and 100B. In certain embodiments, Applicants' NVS Controller 260 implements Applicants' method described hereinbelow. In certain embodiments, the elements and functions of NVS Controller 260 are disposed in NASD 250.

Figure 4:
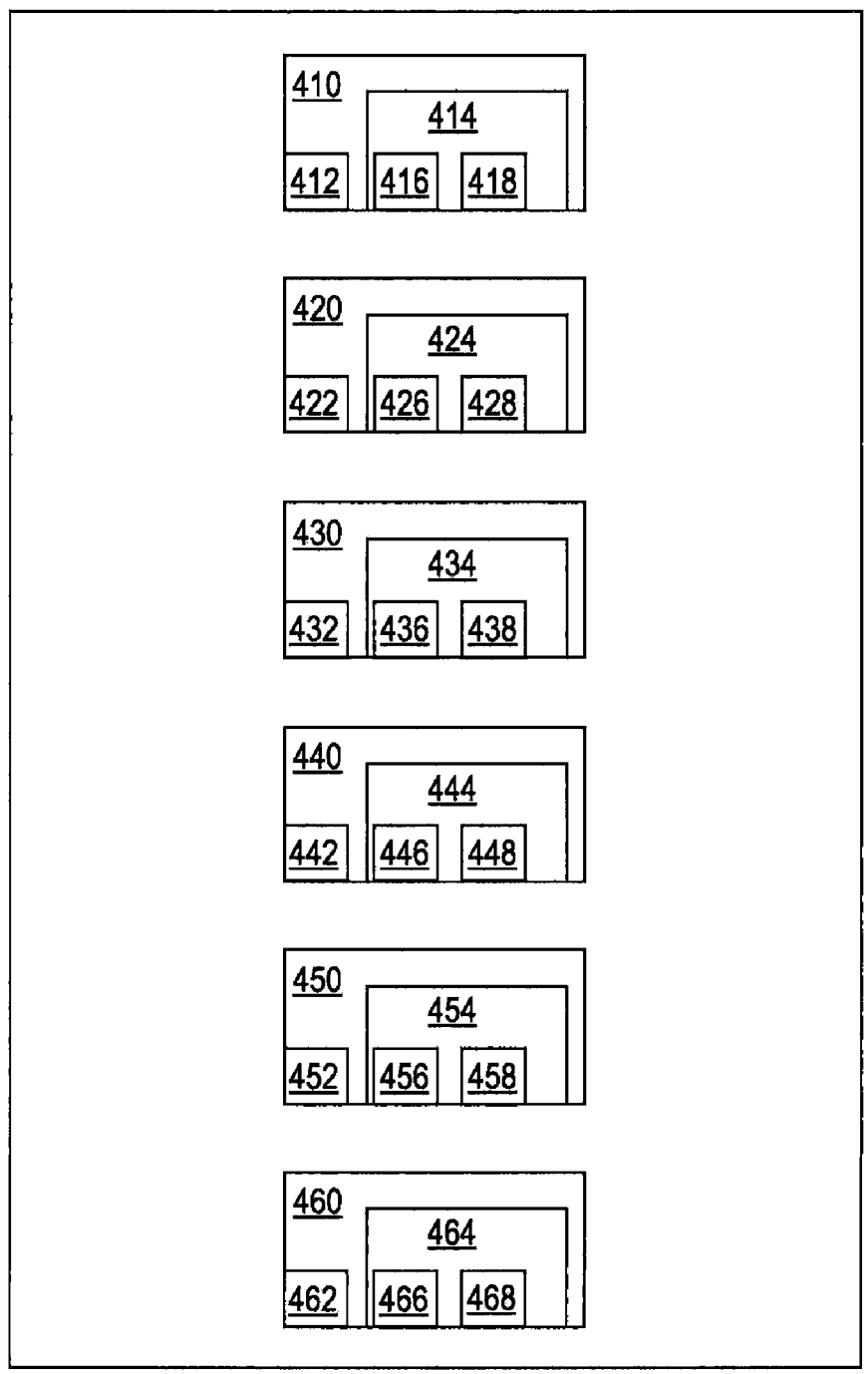
FIG. 4 is block diagram illustrating the elements of Applicants' NVS controller.

FIG. 4 illustrates Applicants' NVS Controller 260 (FIGS. 2, 4). In certain embodiments, Applicants' method utilizes Applicants' NVS Controller 260 to manage primary and secondary redundant NVS in Applicants' multi-nodal (cluster) system, such as system 200 (FIG. 2). In the illustrated embodiment of FIG. 2, Applicants' NVS Controller 260 communicates with other elements of Applicants' data storage system 200 (FIG. 2) via fabric 210 (FIG. 2). In other embodiments, Applicants' NVS Controller 260 is integral with Applicants' storage library, such as storage library 100. In other embodiments, Applicants' NVS Controller 260 is integral with NASD 250.

As illustrated in FIG. 4, Applicants' NVS controller 260 includes a management module 410. The management module 410 may be implemented and/or deployed in a data storage library/data storage system (e.g., library 100 (FIG. 1), system 200 (FIG. 2)) as hardware, software, firmware, and combinations thereof. The management module 410 is configured to manage primary and secondary NVS in a multi-nodal cluster system. In the illustrated embodiment of FIG. 4, management module 410 comprises processor 412 and a computer readable medium 414. Operating system/microcode 416 and instructions 418 are encoded in computer readable medium 414. Processor 412 utilizes operating system/microcode 416 to operate management module 410. Instructions 418 comprise computer readable program code used by processor 410 to implement Applicants' method, as described herein. In the illustrated embodiment of FIG. 4, management module 410 comprises one or more of a mirror module 420, a swap module 430, a detection module 440, a priority module 450, and a destage module 460.

In the illustrated embodiment of FIG. 4, mirror module 420 comprises processor 422 and a computer readable medium 424. Operating system/microcode 426 and instructions 428 are encoded in computer readable medium 424. Processor 422 utilizes operating system/microcode 426 to operate mirror module 420. Instructions 428 comprise computer readable program code used by processor 420 to implement portions of Applicants' method, as described herein. In certain embodiments, mirror module 420 mirrors NVS backup data from one NVS backup disposed in one cluster to one or more other NVS backups disposed in one or more other clusters.

In the illustrated embodiment of FIG. 4, swap module 430 comprises processor 432 and a computer readable medium 434. Operating system/microcode 436 and instructions 438 are encoded in computer readable medium 434. Processor 432 utilizes operating system/microcode 436 to operate swap module 430. Instructions 438 comprise computer readable program code used by processor 430 to implement portions of Applicants' method, as described herein. In certain embodiments, swap module 430 synchronously switches the pointers to Primary and Secondary NVS backups disposed in the same cluster.

In the illustrated embodiment of FIG. 4, detection module 440 comprises processor 442 and a computer readable medium 444. Operating system/microcode 446 and instructions 448 are encoded in computer readable medium 444. Processor 442 utilizes operating system/microcode 446 to operate detection module 440. Instructions 448 comprise computer readable program code used by processor 420 to implement portions of Applicants' method, as described herein. In certain embodiments, detection module 440 detects a new cluster added to the library/system. In certain embodiments, detection module detects one or more failed clusters disposed within the library/system.

In the illustrated embodiment of FIG. 4, priority module 450 comprises processor 452 and a computer readable medium 454. Operating system/microcode 456 and instructions 458 are encoded in computer readable medium 454. Processor 452 utilizes operating system/microcode 456 to operate priority module 450. Instructions 458 comprise computer readable program code used by processor 450 to implement portions of Applicants' method, as described herein. In certain embodiments, priority module 450 destages backup data from one or more NVS backups to one or more storage devices, such storage arrays 180 (FIG. 1) and/or 190 (FIG. 1). The prioritizing may be established according to the number of NVS backup copies remaining, and/or the number of operable clusters.

In the illustrated embodiment of FIG. 4, configuration module 460 comprises processor 462 and a computer readable medium 464. Operating system/microcode 466 and instructions 468 are encoded in computer readable medium 464. Processor 462 utilizes operating system/microcode 466 to operate configuration module 460. Instructions 468 comprise computer readable program code used by processor 462 to configuration module 460 configures NVS backups utilizing a Primary NVS backup and a Secondary NVS backup disposed in each operable cluster, in accord with Applicants' method described herein.

In certain embodiments, modules 410-460 may share common data registers, memory, or the like. Although FIG. 4 illustrates the management module 410 in combination with modules 420-460, the computer readable program code 218, 228, 238, 248, 258, and/or 268, need not be physically collocated. In certain embodiments, computer readable program code 218, 228, 238, 248, 258, and/or 268, may comprise disparate instructions stored in different locations of a data storage library/data storage system (e.g., library 100, system 200) which when joined logically together, comprise one or more modules 410-460 and achieve the state purpose for modules 410-460.

Modules 410-460 of apparatus 400 may be implemented or deployed in a data storage library/data storage system (e.g., library 100, system 200) as executable code. Modules 410-460 may, for instance, comprise one or more physical or logical blocks of computer instructions which may, for instance, be organized as an object, procedure, or function.

In certain embodiments, the management module 410 is configured as a computer program product comprising a computer usable medium having computer usable program code for managing primary and secondary NVS of a multi-nodal cluster system when, for example, one or more nodes are added or removed from a cluster system. In this configuration as a computer program product, management module 410 includes a computer usable program code to detect when a node is added or removed, to mirror backup copies of NVS from one node to one or more remote nodes, to swap the pointers to the primary and secondary NVS space in nodes, to prioritize the destaging (writing) of data to a storage device, and to destage data from NVS backups to storage arrays.

Figure 3:
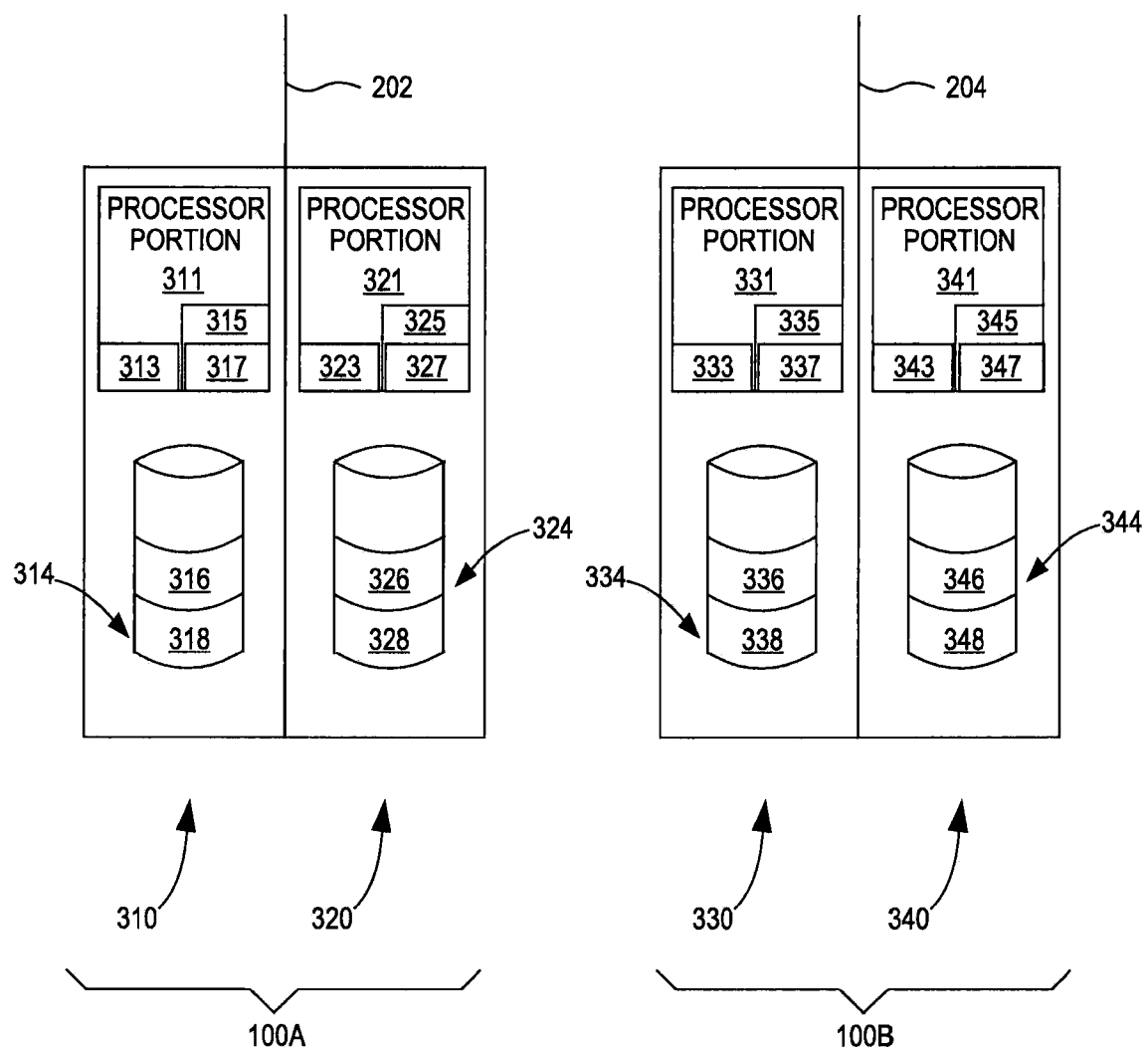
FIG. 3 is a block diagram illustrating the 4 clusters disposed in the data storage system of FIG. 2.

FIG. 3 illustrates a portion of the data storage system of FIG. 2. Referring now to FIGS. 2 and 3, data storage system 200 comprises a total of four clusters, namely clusters 310, 320, 330, and 340. In the illustrated embodiment of FIG. 3, cluster 310 comprises processor portion 311 comprising processor 313, computer readable medium 315 and instructions 317 encoded in computer readable medium 315. Cluster 310 further comprises cache 314 comprising a first NVS portion 316 and a second NVS portion 318.

In the illustrated embodiment of FIG. 3, cluster 320 comprises processor portion 321 comprising processor 323, computer readable medium 325 and instructions 327 encoded in computer readable medium 315. Cluster 320 further comprises cache 324 comprising a first NVS portion 326 and a second NVS portion 328.

In the illustrated embodiment of FIG. 3, cluster 330 comprises processor portion 331 comprising processor 333, computer readable medium 335 and instructions 337 encoded in computer readable medium 335. Cluster 330 further comprises cache 334 comprising a first NVS portion 336 and a second NVS portion 33 8.

In the illustrated embodiment of FIG. 3, cluster 340 comprises processor portion 341 comprising processor 343, computer readable medium 345 and instructions 347 encoded in computer readable medium 345. Cluster 310 further comprises cache 344 comprising a first NVS portion 346 and a second NVS portion 348.

Figure 5A:
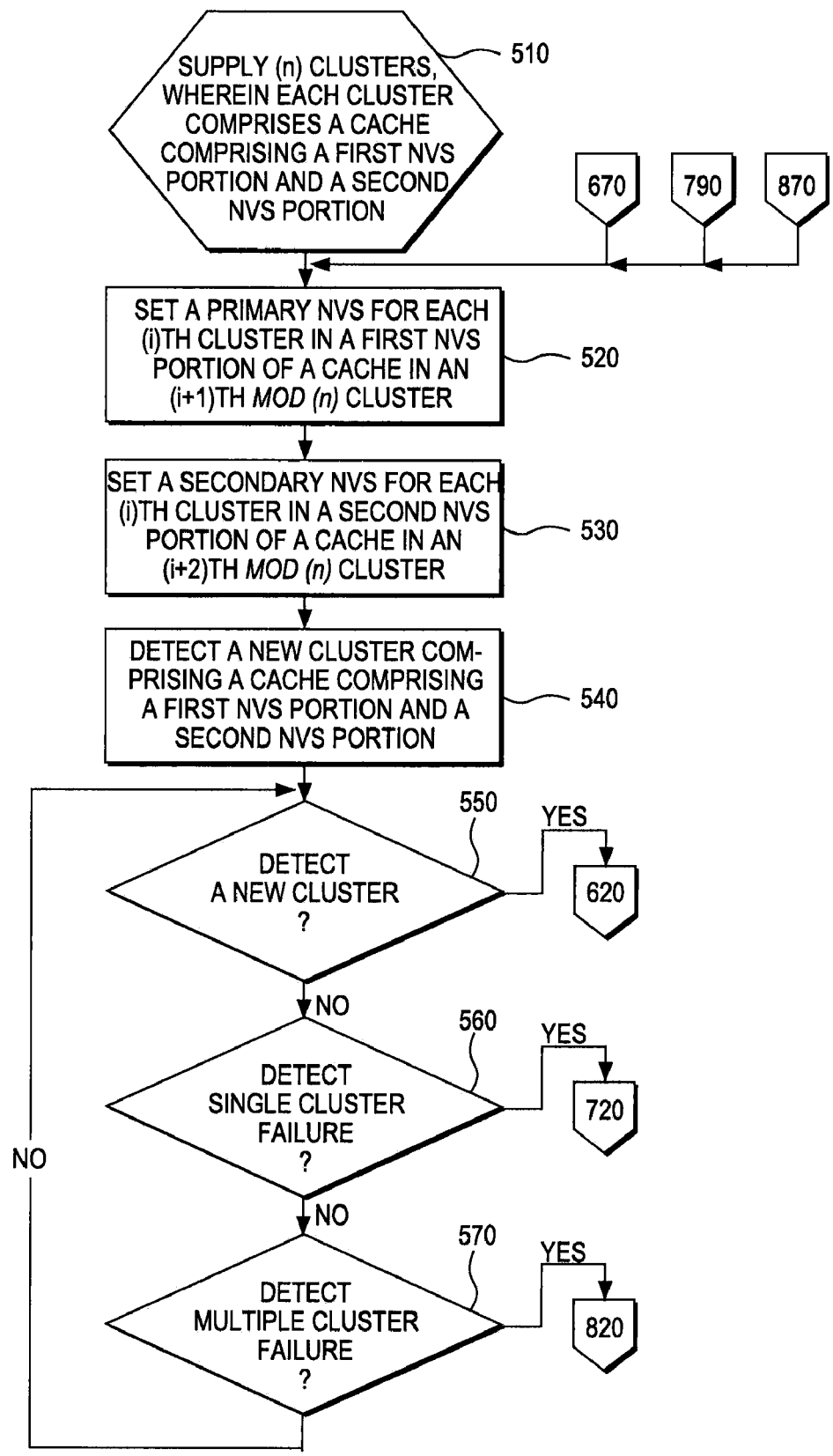
FIG. 5A is a flow chart summarizing the steps of Applicants' method to configure NVS backup for a data storage system comprising (n) clusters.
Figure 6A:
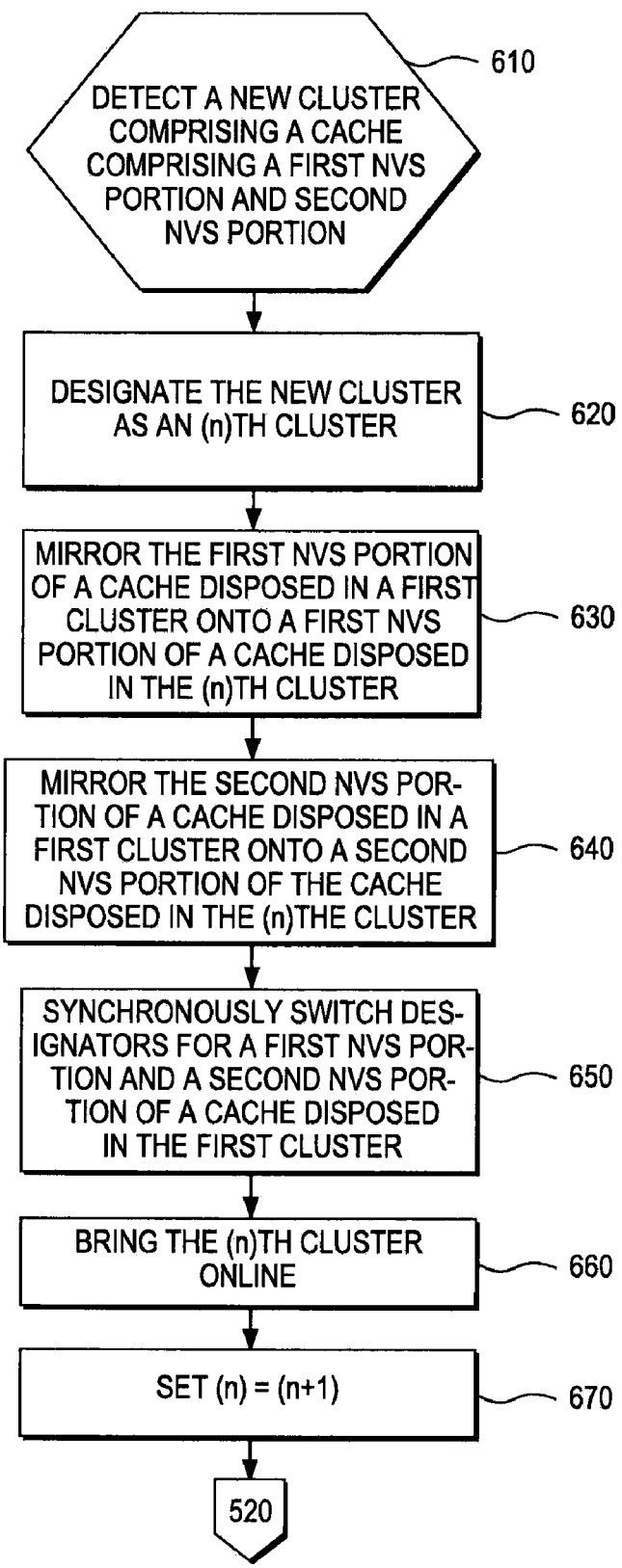
FIG. 6A is a flow chart summarizing the steps of Applicants' method to reconfigure a data storage system when a new cluster is detected.

Applicants' invention comprises a method to manage NVS backup storage for a data storage system comprising (n) clusters, wherein (n) is greater than or equal to 3. FIG. 5A summarizes the steps of this portion of Applicants' method. In certain embodiments, Applicants' method detects a new cluster, and reconfigures the NVS backups disposed in a data storage system now comprising (n+1) clusters. FIG. 6A summarizes the steps of this portion of Applicants' method.

Figure 7A:
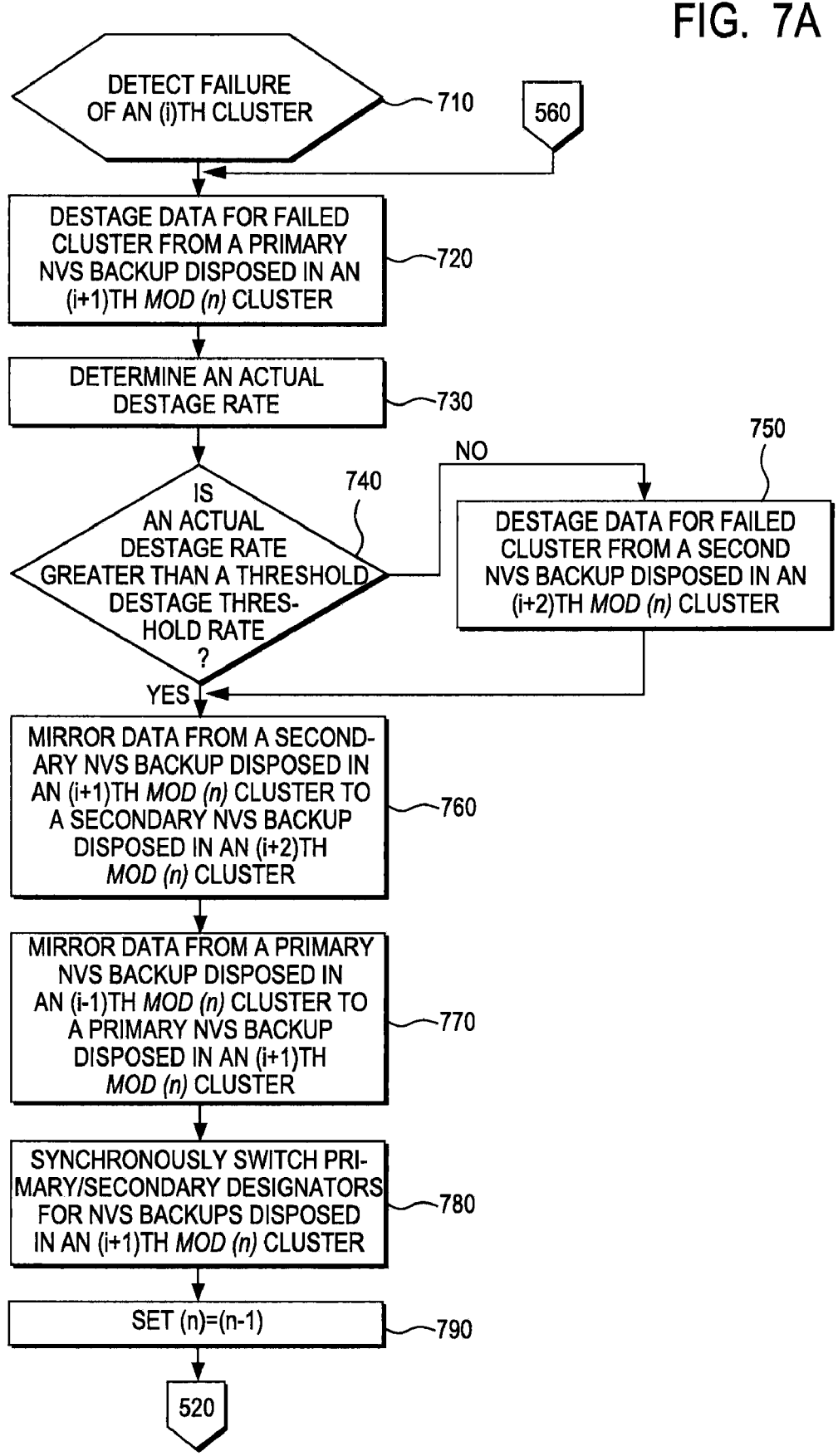
FIG. 7A is a flow chart summarizing the steps of Applicants' method to reconfigure a data storage system when a failed cluster is detected.
Figure 8A:
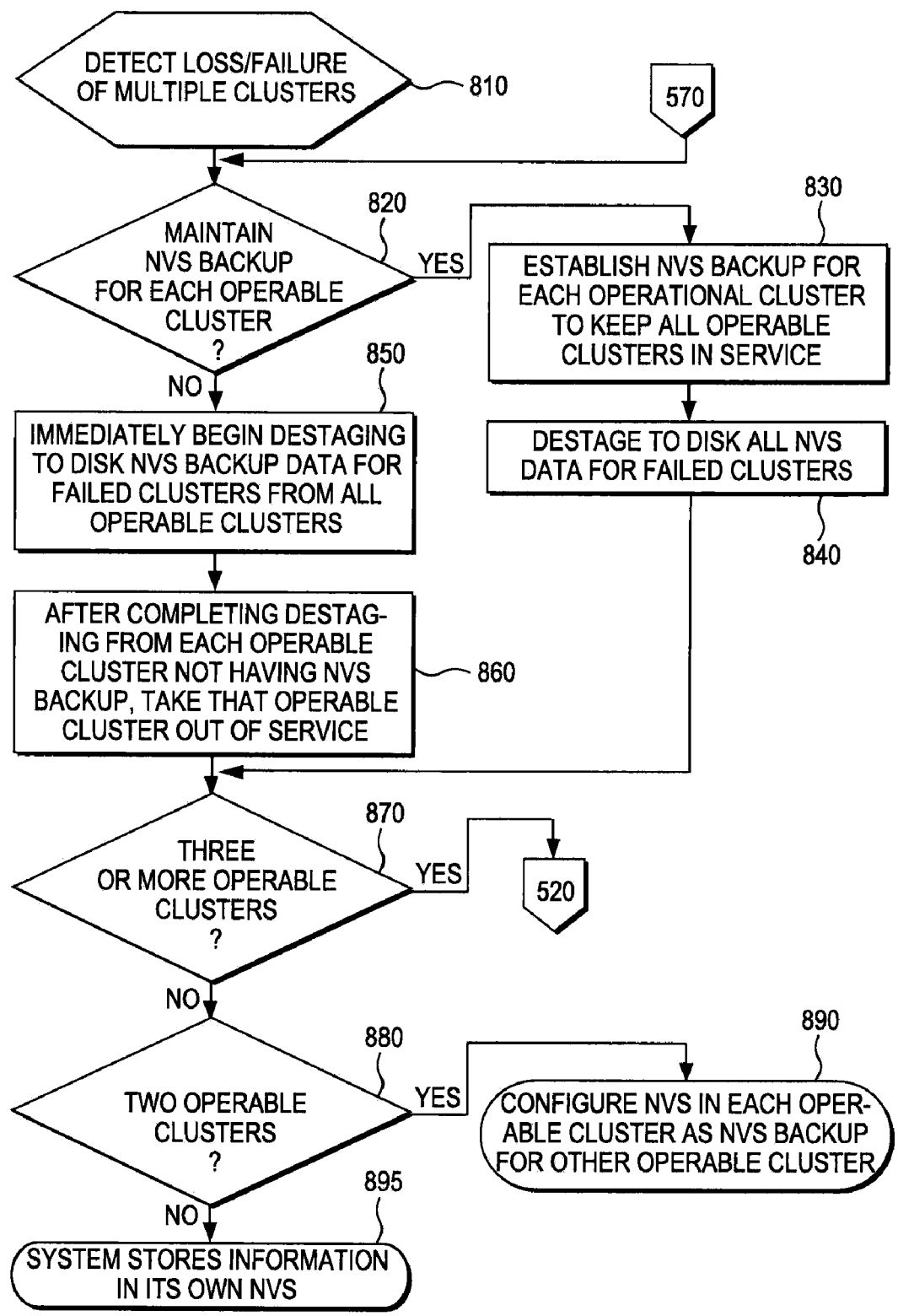
FIG. 8A is a flow chart summarizing the steps of Applicants' method to reconfigure a data storage system when a multiple cluster failures are detected.

In certain embodiments, Applicants method detects a failed cluster, and reconfigures the NVS backups disposed in a data storage system now comprising (n−1) clusters. FIG. 7A summarizes the steps of this portion of Applicants' method. In certain embodiments, Applicants' method detects multiple cluster failure, and reconfigures the NVS backups for two or more operable clusters. FIG. 8A summarizes the steps of this portion of Applicants' method.

Referring now to FIG. 5A, in step 510 the method supplies (n) clusters, such as for example clusters 310, 320, and 330, wherein each cluster comprises a cache, such as for example cache 314, cache 324, and cache 334, respectively, wherein each cache comprises a first NVS portion, such as first NVS portion 316, 326, and 336, respectively, and wherein each cache comprises a second NVS portion, such as second NVS portion 318, 328, and 338, respectively. In certain embodiments, each of the (n) clusters further comprises a plurality of host adapters, a processor, and a plurality of device adapters.

In step 520, the method sets a primary NVS for each (i)th cluster in a first NVS portion of a cache in an (i+1)th modulo (n) cluster. In certain embodiments, step 520 is performed by a host computer in communication with one or more of the (n) clusters. In certain embodiments, step 520 is performed by a processor disposed in any of the (n) clusters, i.e. a master processor. In certain embodiments, step 520 is performed by a NVS controller, such as NVS controller 260 (FIGS. 2, 4). In certain embodiments, step 520 is performed by a NASD, such as NASD 250 (FIG. 2).

In step 530, the method sets a secondary NVS for each (i)th cluster in a second NVS portion of a cache in an (i+2)th modulo (n) cluster. In certain embodiments, step 530 is performed by a host computer in communication with one or more of the (n) clusters. In certain embodiments, step 530 is performed by a processor disposed in any of the (n) clusters, i.e. a master processor. In certain embodiments, step 530 is performed by a NVS controller, such as NVS controller 260 (FIGS. 2, 4). In certain embodiments, step 530 is performed by a NASD, such as NASD 250 (FIG. 2).

The following Example I is presented to further illustrate to persons skilled in the art how to implement the method of FIG. 5A. This example is not intended as a limitation, however, upon the scope of the invention.

Example I

Figure 5B:
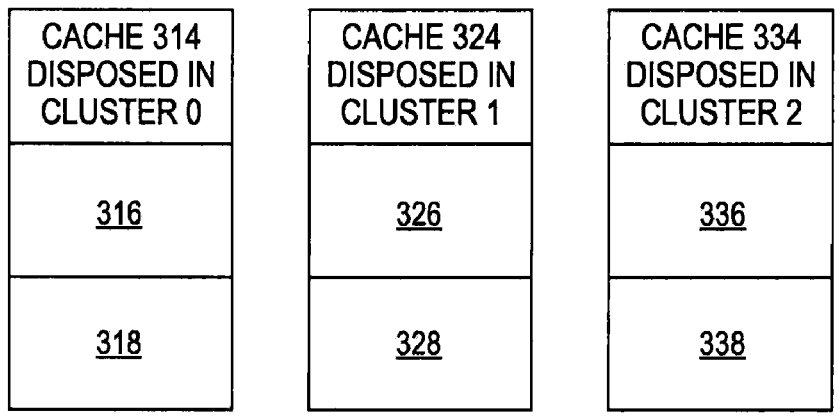
FIGS. 5B, 5C, 5D, and 5E, illustrate certain steps of the method of FIG. 5A.
Figure 5C:
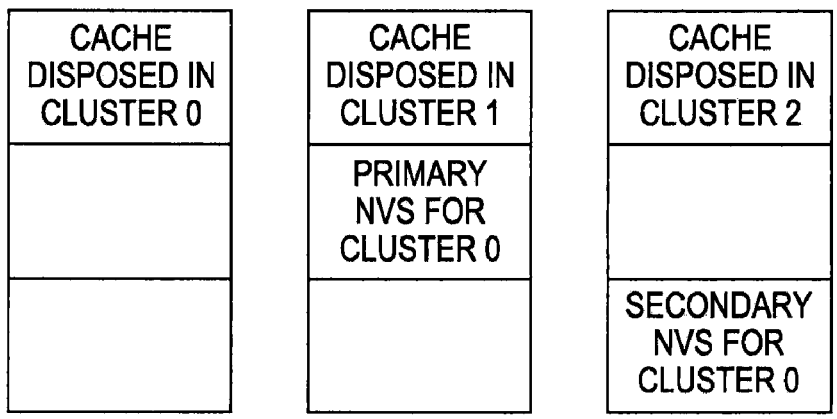

Referring now to FIGS. 3A, 4, and 5A through 5E, FIGS. 3A and 5B show caches 314, 324, and 334, disposed in clusters 310, 320, and 330, prior to configuring NVS backup storage using Applicants' method, wherein cluster 310 is designated a first cluster, and cluster 320 a second cluster, and cluster 330 a third cluster. Referring to FIGS. 5B and 5C, in a first iteration of steps 520 and 530, the method sets first NVS portion 326 of cache 324 disposed in cluster 1 as a primary NVS backup for cluster 0, and second NVS portion 338 of cache 344 disposed in cluster 2 as a secondary NVS backup for cluster 0.

Figure 5D:
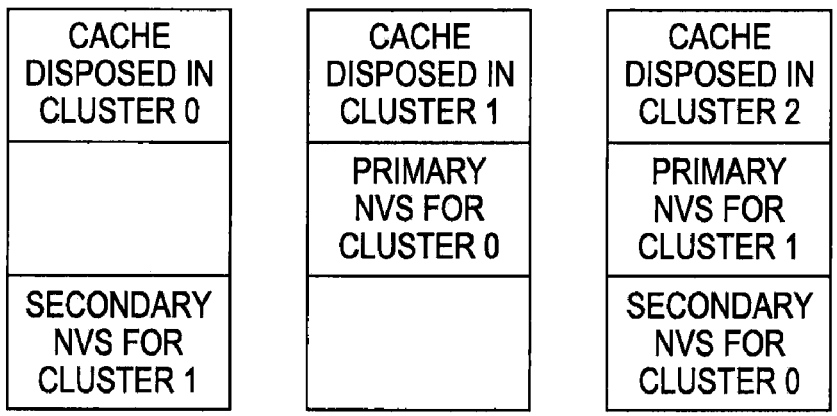

Referring to FIGS. 5B and 5D, in a second iteration of steps 520 and 530, the method sets first NVS portion 336 of cache 334 disposed in cluster 2 as a primary NVS backup for cluster 1, and second NVS portion 318 of cache 314 disposed in cluster 0 as a secondary NVS backup for cluster 1. As those skilled in the art will appreciate, cluster (i+2) modulo (n), wherein (i) is 1 and (n) is 3, is cluster 0.

Figure 5E:
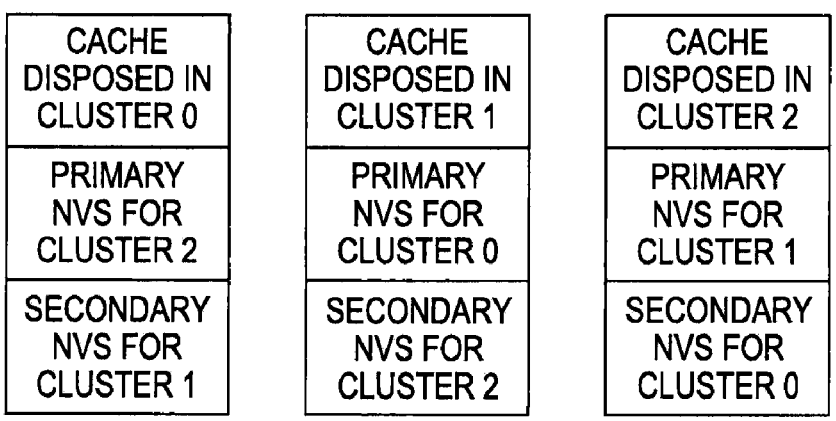

Referring to FIGS. 5B and 5E, in a third iteration of steps 520 and 530, the method sets first NVS portion 316 of cache 314 disposed in cluster 0 as a primary NVS backup for cluster 2, and second NVS portion 328 of cache 324 disposed in cluster 1 as a secondary NVS backup for cluster 2. As those skilled in the art will appreciate, cluster (i+1) modulo (n), wherein (i) is 2 and (n) is 3, is cluster 0. Cluster (i+2) modulo (n), wherein (i) is 2 and (n) is 3, is cluster 1.

Figure 6B:
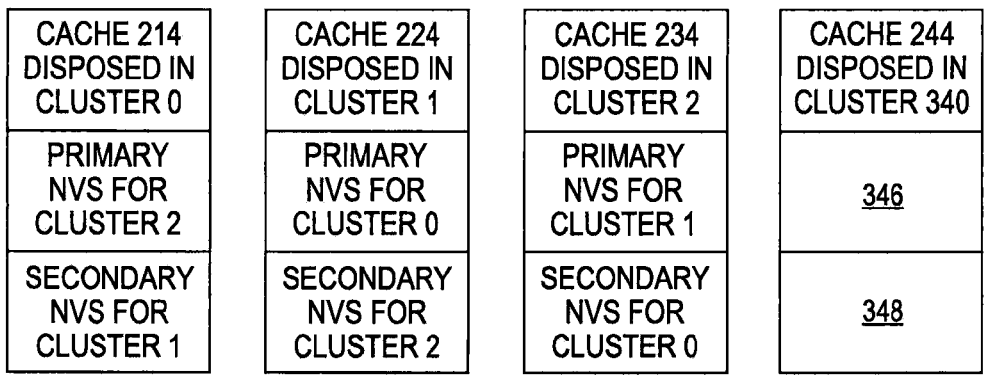
FIGS. 6B, 6C, 6D, and 6E, illustrate certain steps of the method of FIG. 6A.

FIG. 6A summarizes Applicants' method to manage primary and secondary NVS backup when detecting a new cluster in a system already configured to comprise (n) clusters. Referring now to FIG. 6A, in step 610 the method detects a new cluster comprising a cache comprising a first NVS portion and a second NVS portion. For example and referring now to FIGS. 3A, 6A, and 6B, in step 610 the method detects cluster 340 comprising a cache 344 comprising a first NVS portion 346 and a second NVS portion 348. In certain embodiments, step 610 is performed by a host computer in communication with one or more of the (n) clusters. In certain embodiments, step 610 is performed by a processor disposed in any of the (n) clusters, i.e. a master processor. In certain embodiments, step 610 is performed by a NVS controller, such as NVS controller 260 (FIGS. 2, 4). In certain embodiments, step 610 is performed by a NASD, such as NASD 250 (FIG. 2).

In step 620, the method designates the new cluster of step 610 as a (n)th cluster. In certain embodiments, step 620 is performed by a host computer in communication with one or more of the (n) clusters. In certain embodiments, step 620 is performed by a processor disposed in any of the (n) clusters, i.e. a master processor. In certain embodiments, step 620 is performed by a NVS controller, such as NVS controller 260 (FIGS. 2, 4). In certain embodiments, step 620 is performed by a NASD, such as NASD 250 (FIG. 2).

In step 630, the method mirrors a first NVS portion of a cache disposed in a first cluster onto a first NVS portion of a cache disposed in the (n)th cluster, i.e. the new cluster. In certain embodiments, step 630 is performed by a host computer in communication with one or more of the (n) clusters. In certain embodiments, step 630 is performed by a processor disposed in any of the (n) clusters, i.e. a master processor. In certain embodiments, step 630 is performed by a NVS controller, such as NVS controller 260 (FIGS. 2, 4). In certain embodiments, step 630 is performed by a NASD, such as NASD 250 (FIG. 2).

Figure 6C:
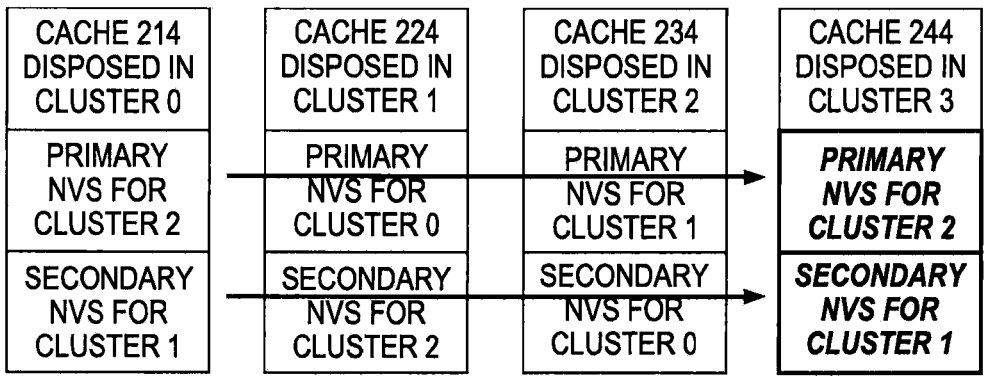

In step 640, the method mirrors a second NVS portion of a cache disposed in a first cluster onto a second NVS portion of a cache disposed in the (n)th cluster, i.e. the new cluster. FIG. 6C shows that a primary NVS for cluster 2 has been mirrored from cache 214 to cache 244, and that a secondary NVS for cluster 1 has been mirrored from cache 214 to cache 244.

In certain embodiments, step 640 is performed by a host computer in communication with one or more of the (n) clusters. In certain embodiments, step 640 is performed by a processor disposed in any of the (n) clusters, i.e. a master processor. In certain embodiments, step 640 is performed by a NVS controller, such as NVS controller 260 (FIGS. 2, 4). In certain embodiments, step 640 is performed by a NASD, such as NASD 250 (FIG. 2).

Figure 6D:
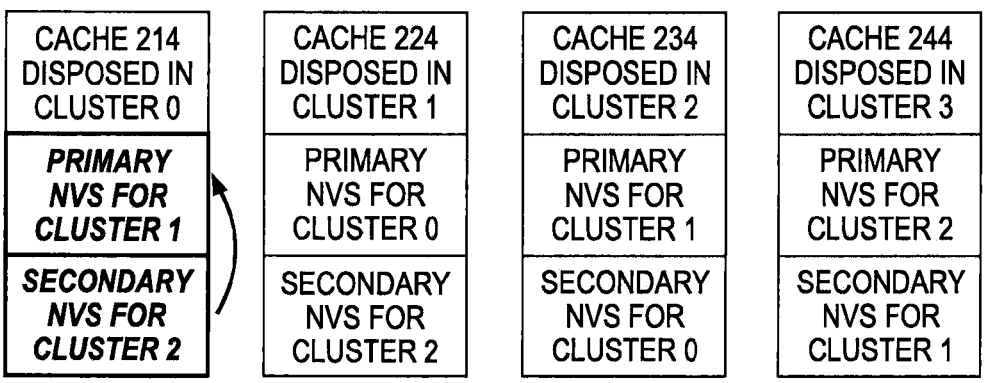

In step 650, the method synchronously switches designators for a first NVS portion and a second NVS portion of the same cache disposed in a first cluster. In certain embodiments, step 650 comprises switching pointers. FIG. 6D shows that the designators for the first NVS portion and the second NVS portion of cache 214 have been switched. In certain embodiments, step 650 is performed by a host computer in communication with one or more of the (n) clusters. In certain embodiments, step 650 is performed by a processor disposed in any of the (n) clusters, i.e. a master processor. In certain embodiments, step 650 is performed by a NVS controller, such as NVS controller 260 (FIGS. 2, 4). In certain embodiments, step 650 is performed by a NASD, such as NASD 250 (FIG. 2).

In step 660, the method brings the (n)th cluster online, i.e. the new cluster. In certain embodiments, step 660 is performed by a host computer in communication with one or more of the (n) clusters. In certain embodiments, step 660 is performed by a processor disposed in any of the (n) clusters, i.e. a master processor. In certain embodiments, step 660 is performed by a NVS controller, such as NVS controller 260 (FIGS. 2, 4). In certain embodiments, step 660 is performed by a NASD, such as NASD 250 (FIG. 2).

In step 670, the system sets (n) equal to (n+1). In certain embodiments, step 670 is performed by a host computer in communication with one or more of the (n) clusters. In certain embodiments, step 670 is performed by a processor disposed in any of the (n) clusters, i.e. a master processor. In certain embodiments, step 670 is performed by a NVS controller, such as NVS controller 260 (FIGS. 2, 4). In certain embodiments, step 670 is performed by a NASD, such as NASD 250 (FIG. 2).

Figure 6E:
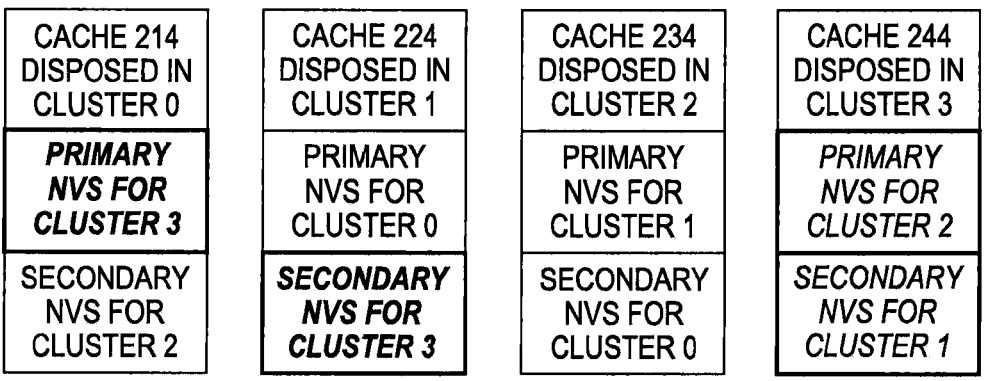

The method transitions from step 670 to step 520 and continues as described herein. FIG. 6E shows that the method in steps 520 and 530 sets the primary NVS portion of cache 214 as the Primary NVS for cluster 3, and sets the secondary NVS portion of cache 224 as the Secondary NVS for cluster 3.

FIG. 7A summarizes Applicants' method to manage primary and secondary NVS backup when detecting a cluster failure in a system configured to comprise (n) clusters. Referring now to FIG. 7A, in step 710 the method detects a cluster failure. In certain embodiments, step 710 is performed by a host computer in communication with one or more of the (n) clusters. In certain embodiments, step 710 is performed by a processor disposed in any of the (n) clusters, i.e. a master processor. In certain embodiments, step 710 is performed by a NVS controller, such as NVS controller 260 (FIGS. 2, 4). In certain embodiments, step 710 is performed by a NASD, such as NASD 250 (FIG. 2).

In step 720, the method destages to disk pending data written to the failed cluster cache using backup data from a Primary NVS backup disposed in an (i+1)th modulo (n) cluster. For example, and referring to FIG. 7B which shows a cluster 1 failure, in step 720 the method destages backup data written to a Primary NVS backup for failed cluster 1, wherein that Primary NVS backup is disposed in cluster 2. In certain embodiments, step 720 is performed by a host computer in communication with one or more of the (n) clusters. In certain embodiments, step 720 is performed by a processor disposed in any of the (n) clusters, i.e. a master processor. In certain embodiments, step 720 is performed by a NVS controller, such as NVS controller 260 (FIGS. 2, 4). In certain embodiments, step 720 is performed by a NASD, such as NASD 250 (FIG. 2).

In step 730, the method determines an Actual Destage Rate for the destaging to disk of data from a primary NVS backup for the failed cluster. In certain embodiments, step 730 is performed by a host computer in communication with one or more of the (n) clusters. In certain embodiments, step 730 is performed by a processor disposed in any of the (n) clusters, i.e. a master processor. In certain embodiments, step 730 is performed by a NVS controller, such as NVS controller 260 (FIGS. 2, 4). In certain embodiments, step 730 is performed by a NASD, such as NASD 250 (FIG. 2).

In step 740, the method determines if the Actual Destage Rate of step 730 is greater than a pre-determined Threshold Destage Rate. In certain embodiments, the Threshold Destage Rate is set by a host computer providing the data to the failed cluster. In certain embodiments, the Threshold Destage Rate is set by the owner/operator of the data storage library, such as library 100. In certain embodiments, step 740 is performed by a host computer in communication with one or more of the (n) clusters. In certain embodiments, step 740 is performed by a processor disposed in any of the (n) clusters, i.e. a master processor. In certain embodiments, step 740 is performed by a NVS controller, such as NVS controller 260 (FIGS. 2, 4). In certain embodiments, step 740 is performed by a NASD, such as NASD 250 (FIG. 2).

If the method determines in step 740 that the Actual Destage Rate of step 730 is greater than a pre-determined Threshold Destage Rate, then the method transitions from step 740 to step 760. If the method determines in step 740 that the Actual Destage Rate of step 730 is not greater than a pre-determined Threshold Destage Rate, then the method transitions from step 740 to step 750 wherein the method also destages data written to a cache in the failed cluster from a Secondary NVS backup disposed in an (i+2) modulo (n) cluster. The method transitions from step 750 to step 760.

Figure 7B:
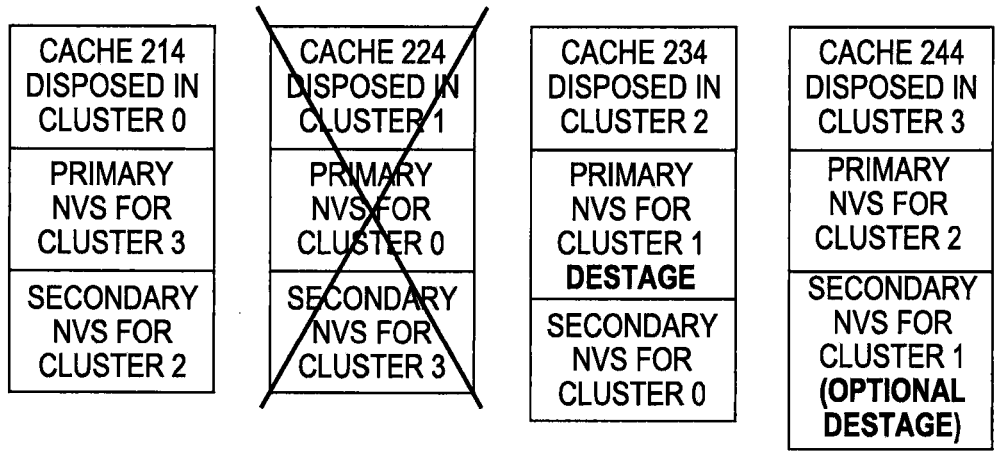
FIGS. 7B, 7C, 7D, and 7E, illustrate certain steps of the method of FIG. 7A.

For example, and referring to FIG. 7B which shows a cluster 1 failure, in step 740 the method destages backup data written to a Secondary NVS backup for failed cluster 1, wherein that Secondary NVS backup is disposed in cluster 3. In certain embodiments, step 750 is performed by a host computer in communication with one or more of the (n) clusters. In certain embodiments, step 750 is performed by a processor disposed in any of the (n) clusters, i.e. a master processor. In certain embodiments, step 750 is performed by a NVS controller, such as NVS controller 260 (FIGS. 2, 4). In certain embodiments, step 750 is performed by a NASD, such as NASD 250 (FIG. 2).

Figure 7C:
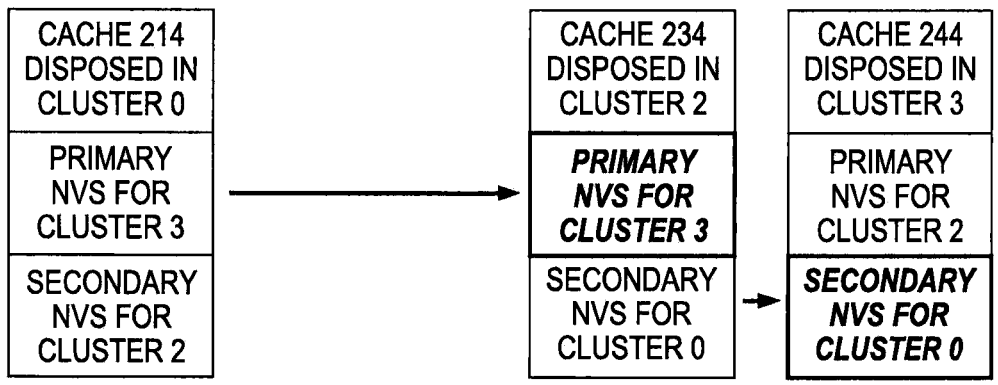

In step 760, the method mirrors data from a Secondary NVS backup disposed in an (i+1)th modulo (n) cluster to a Secondary NVS backup disposed in an (i+2)th modulo (n) cluster. For example, FIG. 7C shows a Secondary NVS backup disposed in cluster 2 being mirrored onto a Secondary NVS backup disposed in cluster 3. In certain embodiments, step 760 is performed by a host computer in communication with one or more of the (n) clusters. In certain embodiments, step 760 is performed by a processor disposed in any of the (n) clusters, i.e. a master processor. In certain embodiments, step 760 is performed by a NVS controller, such as NVS controller 260 (FIGS. 2, 4). In certain embodiments, step 760 is performed by a NASD, such as NASD 250 (FIG. 2).

In step 770, the method mirrors data from a Primary NVS backup disposed in an (i−1)th modulo (n) cluster to a Primary NVS backup disposed in an (i+1)th modulo (n) cluster. For example, FIG. 7C shows a Primary NVS backup disposed in cluster 0 being mirrored onto a Primary NVS backup disposed in cluster 2. In certain embodiments, step 770 is performed by a host computer in communication with one or more of the (n) clusters. In certain embodiments, step 770 is performed by a processor disposed in any of the (n) clusters, i.e. a master processor. In certain embodiments, step 770 is performed by a NVS controller, such as NVS controller 260 (FIGS. 2, 4). In certain embodiments, step 770 is performed by a NASD, such as NASD 250 (FIG. 2).

Figure 7D:
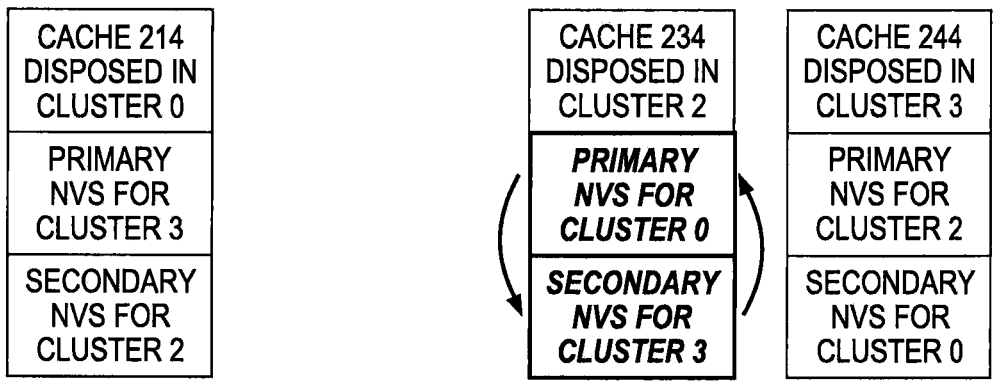

In step 780, the method synchronously switches Primary and Secondary designators for a NVS backup disposed in an (i+1)th modulo (n) cluster. For example, FIG. 7D shows that the Primary NVS backup in cluster 2 is designated a Primary NVS for cluster 0, and the Secondary NVS backup in cluster 2 is designated a Secondary NVS for cluster 3. In certain embodiments, step 780 is performed by a host computer in communication with one or more of the (n) clusters. In certain embodiments, step 780 is performed by a processor disposed in any of the (n) clusters, i.e. a master processor. In certain embodiments, step 780 is performed by a NVS controller, such as NVS controller 260 (FIGS. 2, 4). In certain embodiments, step 780 is performed by a NASD, such as NASD 250 (FIG. 2).

In step 790, the method sets (n) equal to (n−1). In certain embodiments, step 790 is performed by a host computer in communication with one or more of the (n) clusters. In certain embodiments, step 790 is performed by a processor disposed in any of the (n) clusters, i.e. a master processor. In certain embodiments, step 790 is performed by a NVS controller, such as NVS controller 260 (FIGS. 2, 4). In certain embodiments, step 790 is performed by a NASD, such as NASD 250 (FIG. 2).

Figure 7E:
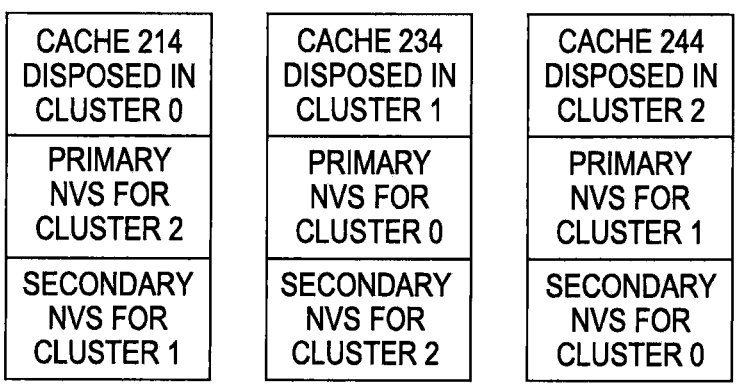

The method transitions from step 790 to step 520 and continues as described herein. For example, FIG. 7E shows caches 214, 234, and 244, configured as Primary and Secondary NVS backups for a system wherein (n) is 3.

Figure 8B:
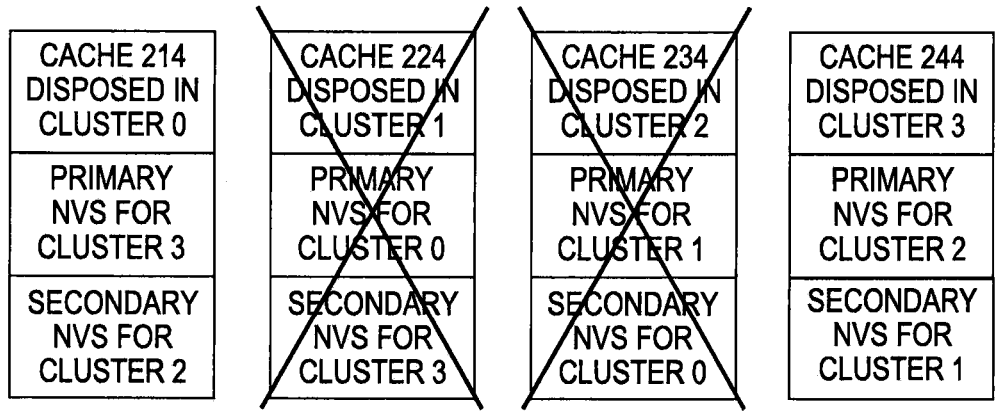

FIG. 8A summarizes Applicants' method to manage primary and secondary NVS backup when detecting two or more cluster failures in a system configured to comprise (n) clusters. Referring now to FIG. 8A, in step 810 the method detects the failure of multiple clusters in a system configured to comprise (n) clusters. For example, FIGS. 8B and 8F illustrates failures of clusters 1 and 2.

In certain embodiments, step 810 is performed by a host computer in communication with one or more of the (n) clusters. In certain embodiments, step 810 is performed by a processor disposed in any of the (n) clusters, i.e. a master processor. In certain embodiments, step 810 is performed by a NVS controller, such as NVS controller 260 (FIGS. 2, 4). In certain embodiments, step 810 is performed by a NASD, such as NASD 250 (FIG. 2).

In step 820, the method determines whether to maintain a remote NVS backup for each operable cluster. In certain embodiments, step 820 is performed by a host computer in communication with one or more of the (n) clusters. In certain embodiments, step 820 is performed by a processor disposed in any of the (n) clusters, i.e. a master processor. In certain embodiments, step 820 is performed by a NVS controller, such as NVS controller 260 (FIGS. 2, 4). In certain embodiments, step 820 is performed by a NASD, such as NASD 250 (FIG. 2).

If the method elects in step 820 to not maintain a remote NVS backup for each operable cluster while destaging to disk backup data for the failed clusters, then the method transitions from step 820 to step 850 wherein the method immediately begins to destage to disk backup data for the failed clusters. For example, in FIG. 8C the method immediately begins destaging back up data for failed cluster 1 from a Secondary NVS backup in cluster 3, and data for failed cluster 2 from Primary NVS backup in cluster 3 and data for failed cluster 2 from Secondary NVS backup in cluster 0. While this destaging operation is being performed, there is no NVS backup for operable cluster 0. Therefore, cluster 0 will not accept any I/O from any host computer until an NVS backup is later created.

In certain embodiments, step 850 is performed by a host computer in communication with one or more of the (n) clusters. In certain embodiments, step 850 is performed by a processor disposed in any of the (n) clusters, i.e. a master processor. In certain embodiments, step 850 is performed by a NVS controller, such as NVS controller 260 (FIGS. 2, 4). In certain embodiments, step 850 is performed by a NASD, such as NASD 250 (FIG. 2).

In step 860, after destaging all backup data for failed cluster 2 from cluster 0 the method takes cluster 0 completely out of service until cluster 3 completes destaging backup data. After cluster 3 completes destaging backup data, the method configures a NVS backup in cluster 3 for cluster 0. For example, FIG. 8D shows a Secondary NVS in cluster 3 configured as a NVS backup for cluster 0. In certain embodiments, step 860 is performed by a host computer in communication with one or more of the (n) clusters. In certain embodiments, step 860 is performed by a processor disposed in any of the (n) clusters, i.e. a master processor. In certain embodiments, step 860 is performed by a NVS controller, such as NVS controller 260 (FIGS. 2, 4). In certain embodiments, step 860 is performed by a NASD, such as NASD 250 (FIG. 2).

In step 870, the method determines if three or more clusters remain operational. In certain embodiments, step 870 is performed by a host computer in communication with one or more of the (n) clusters. In certain embodiments, step 870 is performed by a processor disposed in any of the (n) clusters, i.e. a master processor. In certain embodiments, step 870 is performed by a NVS controller, such as NVS controller 260 (FIGS. 2, 4). In certain embodiments, step 870 is performed by a NASD, such as NASD 250 (FIG. 2).

If the method determines in step 870 that three or more clusters remain operational, then the method transitions from step 870 to step 520 and continues as described herein. If the method determines in step 870 that three or more clusters are not operational, then the method transitions from step 870 to step 880 wherein the method determines if two clusters remain operable. In certain embodiments, step 880 is performed by a host computer in communication with one or more of the (n) clusters. In certain embodiments, step 880 is performed by a processor disposed in any of the (n) clusters, i.e. a master processor. In certain embodiments, step 880 is performed by a NVS controller, such as NVS controller 260 (FIGS. 2, 4). In certain embodiments, step 880 is performed by a NASD, such as NASD 250 (FIG. 2).

If the method determines in step 880 that only one cluster remains operable, then the method transitions from step 880 to step 895 wherein the data storage system stores information in its own NVS. Alternatively, if the method determines in step 880 that two clusters remain operable, then the method transitions from step 880 to step 890 wherein the method configures a NVS backup for each operable cluster in the other operable cluster. For example, FIGS. 8E and 8I shows a NVS backup in cluster 0 for cluster 3, and a NVS backup in cluster 3 for cluster 0.

In certain embodiments, step 890 is performed by a host computer in communication with one or more of the (n) clusters. In certain embodiments, step 890 is performed by a processor disposed in any of the (n) clusters, i.e. a master processor. In certain embodiments, step 890 is performed by a NVS controller, such as NVS controller 260 (FIGS. 2, 4). In certain embodiments, step 890 is performed by a NASD, such as NASD 250 (FIG. 2).

If the method elects in step 820 to maintain a remote NVS backup for each operable cluster while destaging to disk backup data for the failed clusters, then the method transitions from step 820 to step 830 wherein the method establishes a NVS backup for each operable cluster in order to allow each operable cluster to continue to accept I/O from one or more host computers. For example, FIG. 8G shows a Primary NVS portion disposed in cluster 3 configured as a Primary NVS backup for cluster 0. In certain embodiments, step 830 is performed by a host computer in communication with one or more of the (n) clusters. In certain embodiments, step 830 is performed by a processor disposed in any of the (n) clusters, i.e. a master processor. In certain embodiments, step 830 is performed by a NVS controller, such as NVS controller 260 (FIGS. 2, 4). In certain embodiments, step 830 is performed by a NASD, such as NASD 250 (FIG. 2).

In step 840, the method destages to disk all NVS backup data for the failed clusters. For example, FIG. 8H shows Secondary NVS portions in both clusters 0 and 3 destaging backup data to disk for failed clusters 1 and 2. The method transitions from step 840 to step 870 and continues as described herein.

In certain embodiments, step 840 is performed by a host computer in communication with one or more of the (n) clusters. In certain embodiments, step 840 is performed by a processor disposed in any of the (n) clusters, i.e. a master processor. In certain embodiments, step 840 is performed by a NVS controller, such as NVS controller 260 (FIGS. 2, 4). In certain embodiments, step 840 is performed by a NASD, such as NASD 250 (FIG. 2).

Figure 8C:
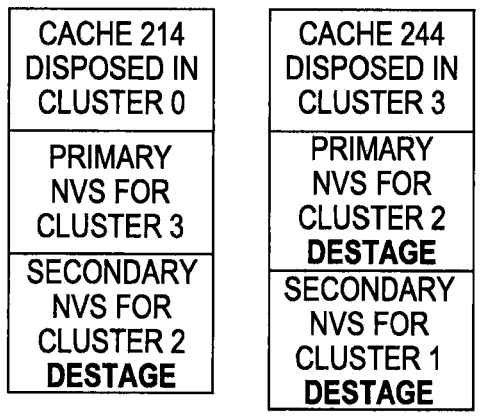
Figure 8D:
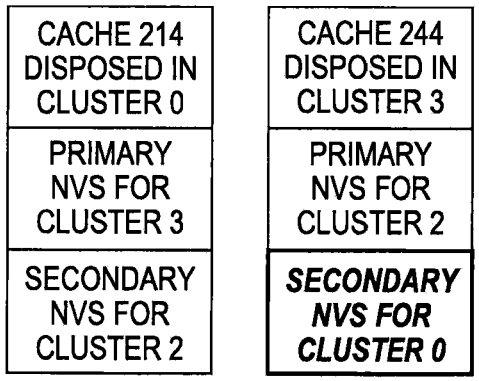
Figure 8E:
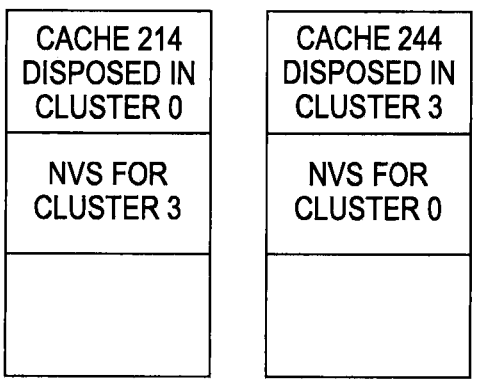

Comparing FIGS. 8C and 8D with FIGS. 8G and 8H illustrates two differing embodiments of FIG. 8A. In a first embodiment of steps 850 and 860, as shown in FIGS. 8C and 8D, the method immediately destages backup data as fast as possible even though not all operable clusters have an NVS backup. In this embodiment, data for the failed clusters is destaged faster, but not all clusters remain online to accept I/O from the host computers.

In a second embodiment of steps 830 and 840, as shown in FIGS. 8G and 8H, the method maintains a NVS backup for all operable clusters, and therefore, all operable clusters remain online to accept I/O from the host computers, while destaging to disk backup data for the failed clusters more slowly.

In certain embodiments, individual steps recited in FIGS. 5A, 6A, 7A, and 8A, may be combined, eliminated, or reordered.

In certain embodiments, Applicants' invention includes instructions, such as instructions 226 (FIG. 2), 236 (FIG. 2), 246 (FIG. 2), 317 (FIG. 3), 327 (FIG. 3), 337 (FIG. 3), 347 (FIG. 3), 418 (FIG. 4), 428 (FIG. 4), 438 (FIG. 4), 448 (FIG. 4), 458 (FIG. 4), 468 (FIG. 4), residing in computer readable medium 224 (FIG. 2), 234 (FIG. 2), 244 (FIG. 2), 315 (FIG. 3), 325 (FIG. 3), 335 (FIG. 3), 345 (FIG. 3), 414 (FIG. 4), 424 (FIG. 4), 434 (FIG. 4), 444 (FIG. 4), 454 (FIG. 4), and/or 464 (FIG. 4), respectively, wherein those instructions are executed by a processor, such as processor 222 (FIG. 2), 232 (FIG. 2), 242 (FIG. 2), 313 (FIG. 3), 323 (FIG. 3), 333 (FIG. 3), 343 (FIG. 3), 412 (FIG. 4), 422 (FIG. 4), 432 (FIG. 4), 442 (FIG. 4), 452 (FIG. 4), 462 (FIG. 4), respectively, to perform one or more of steps 520, 530, 540, 550, 560, and/or 570, recited in FIG. 5A, and/or one or more of steps 610, 620, 630, 640, 650, 660, and/or 670, recited in FIG. 6A, and/or one or more of steps 710, 720, 730, 740, 750, 760, 770, 780, and/or 790, recited in FIG. 7A, and/or one or more of steps 810, 820, 830, 840, 850, 860, 870, 880, 890, and/or 895, recited in FIG. 8.

In other embodiments, Applicants' invention includes instructions residing in any other computer program product, where those instructions are executed by a computer external to, or internal to, storage library 100 (FIG. 1), or data storage system 200 (FIG. 2), to perform one or more of steps 520, 530, 540, 550, 560, and/or 570, recited in FIG. 5A, and/or one or more of steps 610, 620, 630, 640, 650, 660, and/or 670, recited in FIG. 6A, and/or one or more of steps 710, 720, 730, 740, 750, 760, 770, 780, and/or 790, recited in FIG. 7A, and/or one or more of steps 810, 820, 830, 840, 850, 860, 870, 880, 890, and/or 895, recited in FIG. 8. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to manage non-volatile storage ("NVS") backup in a data storage system, comprising:
   supplying a data storage system comprising (n) clusters, wherein each cluster comprises a processor and a cache, and wherein each cache comprises a first NVS portion and a second NVS portion, wherein (n) is greater than or equal to 3;
   setting, for each value of (i), a primary NVS for an (i)th cluster in a first NVS portion of a cache disposed in an (i+1)th modulo (n) cluster, wherein (i) is greater than or equal to 0 and less than (n);
   setting, for each value of (i), a secondary NVS for an (i)th cluster in a second NVS portion of a cache disposed in an (i+2)th modulo (n) cluster.

2. The method of claim 1, wherein said supplying step further comprises supplying a data storage system comprising (n) clusters, wherein each cluster further comprises one or more host adapters in communication with said cache, one or more device adapters in communication with said cache, and a plurality of data storage devices, wherein said plurality of data storage devices are in communication with one or more of said device adapters.

3. The method of claim 1, further comprising:
  detecting an additional cluster comprising an additional processor and an additional cache comprising an additional first NVS portion and an additional second NVS portion;
  designating said additional cluster a (n)th cluster comprising a (n)th processor and a (n)th cache, wherein said (n)th cache comprises a (n)th first NVS portion and a (n)th second NVS portion;
  mirroring data written to a first NVS portion of a cache disposed in a 0 cluster onto said (n)th first NVS portion;
  mirroring data written to a second NVS portion of a cache disposed in a 0 cluster onto said (n)th second NVS portion;
  synchronously designating a first NVS portion of a cache disposed in a first cluster as a second NVS portion, and a second NVS portion of that same cache as a first NVS portion.

4. The method of claim 3, further comprising:
  bringing said (n)th cluster online; and
  setting (n) equal to (n+1).

5. The method of claim 1, further comprising:
  detecting loss of an (i)th cluster;
  destaging to disk data from a first NVS portion of a cache disposed in an (i+1)th modulo (n) cluster.

6. The method of claim 5, further comprising:
  determining an actual destage rate;
  determining if said actual destage rate is greater than a threshold destage rate;
  operative if said actual destage rate is not greater than said threshold destage rate, destaging to disk data from a second NVS portion of a cache disposed in an (i+2)th modulo (n) cluster.

7. The method of claim 5, further comprising:
  mirroring data written to a second NVS portion of a cache disposed in a (i+1)th modulo (n) cluster to a second NVS portion of a cache disposed in an (i+2)th modulo (n) cluster;
  mirroring data written to a first NVS portion of a cache disposed in an (i−1)th modulo (n) cluster to a first NVS portion of a cache disposed in an (i+1)th modulo (n) cluster;
  synchronously designating a first NVS portion of a cache disposed in an (i+1)th modulo (n) cluster as a second NVS portion, and a second NVS portion of that same cache as a first NVS portion;
  set (n) equal to (n−1).

8. The method of claim 1, further comprising:
  detecting a loss of two clusters;
  determining whether to maintain NVS redundancy for each operable cluster.

9. The method of claim 8, wherein NVS redundancy will not be maintained for each operable cluster, further comprising:
  immediately destaging to disk data from all operable clusters;
  after completing destaging from each operable cluster not having NVS backup, taking that operable cluster out of service.

10. The method of claim 9, further comprising:
  determining that (M) clusters remain operable, wherein (M) is less than (n);
  determining if (M) is greater than or equal to 3;
  operative if (M) is greater than or equal to 3:
    setting, for each value of (i), a primary NVS for an operable (i)th cluster in a first NVS portion of a cache disposed in an operable (i+1)th modulo (M) cluster, wherein (i) is greater than or equal to 0 and less than (M);
    setting, for each value of (i), a secondary NVS for an operable (i)th cluster in a second NVS portion of a cache disposed in an (i+2)th modulo (M) cluster.

11. The method of claim 10, wherein (M) is 2, designating a NVS for an operable (i)th cluster a portion of a cache disposed in an (i+1) modulo (M) cluster.

12. The method of claim 8, wherein NVS backup will be maintained for each operable cluster, further comprising:
  establishing NVS backup for each operable cluster;
  destaging to disk NVS data for each failed cluster.

13. The method of claim 12, further comprising:
  determining that (M) clusters remain operable, wherein (M) is less than (n);
  determining if (M) is greater than or equal to 3;
  operative if (M) is greater than or equal to 3:
    setting, for each value of (i), a primary NVS for an operable (i)th cluster in a first NVS portion of a cache disposed in an operable (i+1)th modulo (M) cluster, wherein (i) is greater than or equal to 0 and less than (M);
    setting, for each value of (i), a secondary NVS for an operable (i)th cluster in a second NVS portion of a cache disposed in an (i+2)th modulo (M) cluster.

14. The method of claim 13, wherein (M) is 2, designating a NVS for an operable (i)th cluster a portion of a cache disposed in an (i+1) modulo (M) cluster.

15. An article of manufacture comprising a computer readable medium comprising computer readable program code disposed therein to manage non-volatile storage ("NVS") backup in a data storage system comprising (n) clusters, wherein each cluster comprises a processor and a cache, and wherein each cache comprises a first NVS portion and a second NVS portion, the computer readable program code comprising a series of computer readable program steps to effect:
  setting, for each value of (i), a primary NVS for an (i)th cluster in a first NVS portion of a cache disposed in an (i+1)th modulo (n) cluster, wherein (i) is greater than or equal to 0 and less than (n);
  setting, for each value of (i), a secondary NVS for an (i)th cluster in a first NVS portion of a cache disposed in an (i+2)th modulo (n).

16. The article of manufacture of claim 15, said computer readable program code further comprising a series of computer readable program steps to effect:
  detecting an additional cluster comprising an additional processor and an additional cache comprising an additional first NVS portion and an additional second NVS portion;
  designating said additional cluster a (n)th cluster comprising a (n)th processor and a (n)th cache, wherein said (n)th cache comprises a (n)th first NVS portion and a (n)th second NVS portion;
  mirroring data written to a first NVS portion of a cache disposed in a 0 cluster onto said (n)th first NVS portion;
  mirroring data written to a second NVS portion of a cache disposed in a 0 cluster onto said (n)th second NVS portion;

synchronously designate a first NVS portion of a cache disposed in a 0 cluster as a second NVS portion, and a second NVS portion of that same cache as a first NVS portion;

bringing said (n)th cluster online; and setting (n) equal to (n+1).

17. The article of manufacture of claim 15, said computer readable program code further comprising a series of computer readable program steps to effect:

detecting loss of an (i)th cluster;

destaging to disk data from a first NVS portion of a cache disposed in an (i+1)th modulo (n) cluster.

18. The article of manufacture of claim 17, said computer readable program code further comprising a series of computer readable program steps to effect:

determining an actual destage rate;

determining if said actual destage rate is greater than a threshold destage rate;

operative if said actual destage rate is not greater than said threshold destage rate, destaging to disk data from a second NVS portion of a cache disposed in an (i+2)th modulo (n) cluster.

19. The article of manufacture of claim 17, said computer readable program code further comprising a series of computer readable program steps to effect:

mirroring data written to a second NVS portion of a cache disposed in a (i+1)th modulo (n) cluster to a second NVS portion of a cache disposed in an (i+2)th modulo (n) cluster;

mirroring data written to a first NVS portion of a cache disposed in an (i−1)th modulo (n) cluster to a first NVS portion of a cache disposed in an (i+1)th modulo (n) cluster;

synchronously designate a first NVS portion of a cache disposed in an (i+1)th modulo (n) cluster as a second NVS portion, and a second NVS portion of that same cache as a first NVS portion set (n) equal to (n−1).

20. The article of manufacture of claim 15, said computer readable program code further comprising a series of computer readable program steps to effect:

detecting a loss of two clusters;

determining whether to maintain NVS redundancy for each operable cluster.

21. The article of manufacture of claim 20, wherein NVS redundancy will not be maintained for each operable cluster, said computer readable program code further comprising a series of computer readable program steps to effect:

immediately destaging to disk data from all operable clusters;

after completing destaging from each operable cluster not having NVS backup, taking that operable cluster out of service.

22. The article of manufacture of claim 21, said computer readable program code further comprising a series of computer readable program steps to effect:

determining that (M) clusters remain operable, wherein (M) is less than (n);

determining if (M) is greater than or equal to 3;

operative if (M) is greater than or equal to 3:

setting, for each value of (i), a primary NVS for an operable (i)th cluster in a first NVS portion of a cache disposed in an operable (i+1)th modulo (M) cluster, wherein (i) is greater than or equal to 0 and less than (M);

setting, for each value of (i), a secondary NVS for an operable (i)th cluster in a second NVS portion of a cache disposed in an (i+2)th modulo (M) cluster.

23. The article of manufacture of claim 22, wherein (M) is 2, said computer readable program code further comprising a series of computer readable program steps to effect designating a NVS for an operable (i)th cluster a portion of a cache disposed in an (i+1) modulo (M) cluster.

24. The article of manufacture of claim 20, wherein NVS redundancy will be maintained for each operable cluster, said computer readable program code further comprising a series of computer readable program steps to effect:

establishing NVS backup for each operable cluster;

destaging to disk NVS data for each failed cluster;

determining that (M) clusters remain operable, wherein (M) is less than (n);

determining if (M) is greater than or equal to 3;

operative if (M) is greater than or equal to 3:

setting, for each value of (i), a primary NVS for an operable (i)th cluster in a first NVS portion of a cache disposed in an operable (i+1)th modulo (M) cluster, wherein (i) is greater than or equal to 0 and less than (M);

setting, for each value of (i), a secondary NVS for an operable (i)th cluster in a second NVS portion of a cache disposed in an (i+2)th modulo (M) cluster.

25. The article of manufacture of claim 24, wherein (M) is 2, designating a NVS for an operable (i)th cluster a portion of a cache disposed in an (i+1) modulo (M) cluster.

* * * * *